3,428,544
ELECTRODE COATED WITH ACTIVATED PLATINUM GROUP COATINGS
Giuseppe Bianchi and Antonio Nidola, Milan, Italy, assignors to Oronzio de Nora Impianti Elettrochimici S.A.S., Milan, Italy, a corporation of Italy
No Drawing. Filed Nov. 8, 1965, Ser. No. 506,852
U.S. Cl. 204—290    3 Claims
Int. Cl. B01k *3/06*

---

ABSTRACT OF THE DISCLOSURE

Method of improving the catalytic activity of coatings of metals of the platinum group on a base structure and to novel platinum group electrodes produced by the said method. The invention relates especially, but not exclusively, to electrodes for use in the electrolysis of salt solutions.

---

PRIOR ART

Naturally occurring waters such as brackish, hard, and sea waters and other industrial solutions contain varying quantities of salts such as chlorides, sulfates, bicarbonates, carbonates and small quantities of nitrates, fluorides, etc. When a direct current is passed through such waters, the products of electrolysis are usually strongly corrosive and exert a strong chemical attack on the electrode material necessitating careful selection of the composition of such electrodes. For example, graphite electrodes have been successfully used in solutions containing high concentrations of chloride anions because the carbon is sufficiently resistant to anodic chlorine gas for the anode to last many months. On the other hand, carbon electrodes are not nearly as valuable in sulfate-containing solutions owing to the generation of oxygen which attacks the carbon. In pure sulfate solutions, lead anodes may be used because a protective film of insoluble lead oxide forms at the surface of the electrode which nevertheless continues to conduct electricity. Furthermore, the formation of lead oxide ceases shortly after the start of an electrolysis. On the other hand, lead electrodes are not nearly as valuable in chloride-containing solutions because the chlorine gas which forms at the anode attacks the lead, forming soluble lead chloride which is not retained as a protective coating. Numerous materials have been tried and found unsatisfactory for various reasons usually attributable to chemical reactions with electrolysis products.

OBJECTS OF THE INVENTION

It is an object of the invention to provide novel activated electrodes comprised of a base structure coated with at least one platinum group metal.

It is another object of the invention to provide a novel method of improving the catalytic activity of coatings of metal of the platinum group on a base structure.

These and other objects and advantages of the invention will become obvious from the following detailed description.

THE INVENTION

The method of activating the catalytic activity of a surface of at least one metal of the platinum group comprises incorporating into the platinum group metal minor amounts, preferably 0.2 to 2.0%, preferably 0.5 to 1.5% of at least one other heavy metal element. By a platinum group metal is meant the following elements: ruthenium, rhodium, palladium, osmium, iridium and platinum and alloys of two or more of said metals. Platinum is the preferred metal and is used as representative of the class.

Examples of suitable elements which activate the said platinum group coatings are antimony, bismuth, cadmium, lead, copper, tantalum, vanadium, columbium, etc. The elements of the fifth group of the periodic table are preferred, especially antimony and bismuth due to their high increase in the catalytic activity of the platinum group coatings.

The composition of the base upon which the platinum group coating is to be applied will vary depending upon the use of the coating. Examples of suitable bases are non-metallic bases, such as glass, carbon, etc., and metallic bases, such as stainless steel, iron, nickel, titanium, tantalum, etc. If the said structures are to be used as electrodes for the electrolysis of solutions such as sodium chloride brines to produce chlorine and caustic soda, the base structure is preferably titanium. The anodes may have any convenient form such as plate, expanded mesh, etc.

The electrodes of the invention are particularly useful as anodes for the electrolysis of sodium chloride brines in horizontal mercury cells and diaphragm cells as they have the ability to liberate chlorine at low anode voltages essentially through the life of the platinum coatings and have a low wear rate (loss of platinum group metal per ton of chlorine produced).

Passivity of platinum or platinum coated anodes in electrolysis of brines has been a problem. Passivity refers to the rapid rise in potential in the said anodes after being used for some time at sufficiently high current density under chlorine discharge. This rise in potential indicates that the anodic oxidation of the dissolved chlorine ion to molecular chlorine gas will proceed only at a higher over voltage because of the diminished catalytic activity of the electrode surface due to the build up of a less active platinum oxide layer.

The activated electrodes of the invention have a lower anode potential and operate for a much longer time before reaching passivation than unactivated electrodes which demonstrate the high activity of the electrodes of the invention. This is particularly advantageous in electrolytic cells for the electrolysis of brines such as sodium chloride since the said cells can be operated for much longer periods of time before the electrodes have to be replaced and shut-down time of the cells is greatly reduced. It also reduces the amount of platinum consumed per ton of chlorine making the process more economical.

The activating element may be added to the noble metal element in a variety of ways. If the noble metal coating is to be electrodeposited onto the base structure from a plating solution saturated with a soluble salt of the noble metal, the solution can also be saturated with a soluble salt of the activating metal. Various post-treatments such as heat treating the coated base structure to further increase the activity may be used, if desired. If the noble metal is to be chemideposited by forming a liquid film containing the noble metal on the base structure and then drying the said film, the activating metal in a salt form may be added to the liquid before applying the film on the base structure. A third method of forming the activated electrode comprises heating the platinum coated electrode in the presence of vapors of the activating metal hydride in a hydrogen atmosphere at temperatures high enough to vaporize the said hydride.

Chemideposition is the preferred method of forming the activated anodes since it requires less platinum and permits the codeposition of noble metal alloys such as platinum-iridium in any desired proportion which is not possible by electrodeposition. Also, chemisdeposition permits simultaneous application of the activating element with the noble metal layer such as vanadium, columbium and tantalum which is not possible by electroplating techniques.

The liquids useful for chemideposition are solutions of soluble platinum compounds and soluble compounds of the activating element in an organic solvent. Examples of suitable organic solvents are formamide, butyl trimethyl ammonium hydroxide, acetamide, monomethylamine and polyaminooxyethylenic compounds.

In the following examples there are described several preferred embodiments to illustrate the invention. However, it should be understood that the invention is not intended to be limited to the specific embodiments.

Example I

Strips of titanium plate were etched in an azeotropic hydrogen chloride solution (20%) at the reflux temperature of 110 C. for 40 minutes. The first strip of titanium plate (specimen A) was electroplated with platinum in a bath containing 10 gm./liter of $(NH_4)_2SO_4$, 14 gm./liter of $Pt(NH_3)_2(NO_2)_2$ and sufficient ammonia to give the bath of pH of 10. The bath was operated at 70 to 80° C. and the current density was 70 ma./cm.$^2$. The platinum deposit had a thickness of 2 mg./cm.$^2$. The second strip of titanium plate (specimen B) was plated with platinum under the same conditions except that the said electroplating bath was saturated with $Sb_2O_3$ (about 300 mg./liter).

Specimens A and B were tested as anodes for the electrolysis of concentrated sodium chloride brine, saturated with chlorine gas, at 70° C. The anode potential at 1 a./cm.$^2$, with reference to the normal hydrogen electrode (NHE), and the time to reach passivity at several current densities were determined and the results are summarized in Table I.

TABLE I

|  | Specimen A | Specimen B |
|---|---|---|
| Initial potential at 1a./cm.$^2$ | 1.8 v. | 1.5 v. |
| Passivation time: |  |  |
| At 0.5 a./cm.$^2$ | 1 hour | >3,000 hours. |
| At 1 a./cm.$^2$ | 3 minutes | >500 hours. |

The data in Table I shows specimen B, activated with antimony, has a much higher activity than specimen A since the anode potential is higher and passivation time is shorter for specimen A than for specimen B.

Example II

Strips of titanium plate were etched in an azeotropic hydrogen chloride solution (20%) at reflux temperatures for 40 minutes. One titanium strip was then given a liquid coating consisting of formamide and 17.5 gm. of $$Pt(NH_3)_2(NO_2)$$

per liter of formamide, the said coating corresponding to a platinum thickness of 2 mg./cm.$^2$. This sample was then dried by infrared radiation and held in an oven for 30 minutes at 400° C. in the presence of ammonium phosphate. Nine additional samples were prepared in the same fashion except that the liquid platinum bearing preparation also contained 107 mg./liter of additive in elemental state and powder form. Other samples with additives were prepared by the same procedure except that they were given an annealing post-treatment at 450° C. for 2 hours in an oven with forced air circulation.

The anode potential at 1 a./cm.$^2$ was determined for each specimen for the electrolysis of a concentrated sodium chloride brine, saturated with chlorine gas, at 70° C. and the results obtained after continuous operation at 1 a./cm.$^2$ for 8 hours are summarized in Table II.

TABLE II

| Specimen Additive |  | Anode Potential at 1 a./cm.$^2$, volts |
|---|---|---|
| None | No annealing | 1.8 |
|  | Annealing treatment | 1.8 |
| Antimony | No annealing | 1.43 |
|  | Annealing treatment | 1.35 |
| Bismuth | No annealing | 1.42 |
|  | Annealing treatment | 1.37 |
| Cadmium | No annealing | 1.6 |
|  | Annealing treatment | 1.52 |
| Lead | No annealing | 1.62 |
|  | Annealing treatment | 1.46 |
| Copper | No annealing | 1.47 |
|  | Annealing treatment | 1.45 |
| Mixture of copper and lead | No annealing | 1.45 |
|  | Annealing treatment | 1.36 |
| Tantalum [1] | No annealing | 1.45 |
|  | Annealing treatment | 1.36 |
| Vanadium | No annealing | 1.8 |
|  | Annealing treatment | 1.45 |
| Columbium | No annealing | 1.6 |
|  | Annealing treatment | 1.35 |

[1] Anodes given a cathodic polarization for 30 seconds at 1 a./cm.$^2$ before anode potential determined.

The data in Table II clearly shows that the catalytic activity of the deposited platinum layer is increased by the addition of the elemental additives, particularly in the instance of antimony and bismuth. The annealing treatment further increases this activity.

Example III

A titanium strip, pre-etched in hydrogen chloride as in Example II, was given a liquid coating consisting of formamide and 8.55 gm. (as Pt) of $Pt(NH_3)_2(NO_2)_2$ and 2.15 gm. (as Ir) of $Ir(NH_4)_3(NO_2)_6$ per liter of formamide. The amount of liquid coating corresponded to a deposit of 20 gm./m.$^2$ of an 80% Pt-20%-Ir alloy. The sample was dried by infrared and heated at 400° C. for 30 minutes in the presence of ammonium phosphate. Additional specimens were prepared by the same procedure except that the liquid coating also contained 113 mg./liter of an additive in elemental and powder form. The anode potential at 1 a./cm.$^2$ in chlorinated sodium chloride brine at 70° C. was determined for each specimen as in Example I. The results are summarized in Table III.

TABLE III

| Additive: | Anode potential at 1 a./cm.$^2$ volts |
|---|---|
| None | 1.5 |
| Antimony | 1.4 |
| Bismuth | 1.4 |
| Cadmium | 1.45 |
| Lead | 1.45 |

Again, the additives, particularly antimony and bismuth, increased the catalytic activity of the platinum coating as can be seen by the lower anode potentials.

Example IV

Two anode samples were prepared by the etching and electroplating procedure of Example I for specimen A. One anode was then heated in an oven at 500° C. for 2 hours in a hydrogen atmosphere containing $SbH_3$ vapors. The anode potential at 1 a./cm.$^2$ and the passivation time for each specimen was then determined by the procedure of Example I. The results are summarized in Table IV and show the improved results of the SbH₃ activated specimen.

TABLE IV

|  | Unactivated Anode | SbH₃ Activated Anode |
|---|---|---|
| Initial potential at 1 a./cm.² | 1.8 volts | 1.5 volts |
| Passivation time: |  |  |
| At 0.5 a./cm.² | 1 hour | 3,000 hours |
| At 1.0 a./cm.² | 3 minutes | 500 hours |

Example V

Strips of titanium samples were etched in azeotropic hydrogen chloride solution (20%) at the reflux temperature of 110° C. for 40 minutes. One strip of titanium plate (specimen C) was electroplated with platinum in a bath containing 9.2 gm./liter of $(NH_4)_2SO_4$, 7 gm./liter of $Pt(NH_3)_2(NO_2)_2$ and sufficient $H_2SO_4$ to give the bath a pH between 1.5 and 2.5. The platinum deposit had a thickness of 2 mg./cm.² Another strip of titanium plate (specimen D) was plated with platinum under the same conditions except that the said electroplating bath was saturated with $Sb_2O_3$ (about 150 mg./liter).

The anode potential at 1 a./cm.² was determined for each specimen in a concentrated sodium chloride brine, saturated with chlorine gas at 70° C. The values measured after 40 hours of continuous operation are given in Table V.

TABLE V

Anode potential (NHE) at
1 a./cm.² after 40 hours:                 Volts
  Specimen C _____ 1.8
  Specimen D _____ 1.35

Example VI

Strips of titanium samples were etched in azeotropic hydrogen chloride solution (20%) at reflux temperature (110° C.) for 40 minutes. One strip of titanium plate (specimen E) was electroplated with platinum in a bath containing 14 gm./liter of $Pt(NH_3)_2(NO_2)_2$ and 10 gm./liter of $H_3BO_3$, so as to give the bath a pH of 5. The platinum deposit had a thickness of 2 mg./cm.² Another strip of titanium plate (specimen F) was plated with platinum under the same conditions, except that said electroplating bath was saturated with $Sb_2O_3$ (about 200 mg./liter).

The anode potential at 1 a./cm.² was determined for each specimen in a concentrated sodium chloride brine, saturated with chlorine gas at 70° C. The values measured after 8 hours of continuous operation are given in Table VI.

TABLE VI

|  | Specimen E | Specimen F |
|---|---|---|
| Anode potential (NHE) at 1 a./cm.² after 8 hours: |  |  |
| No annealing | 1.8 volts | 1.48 volts |
| Annealing treatment | 1.6 volts | 1.35 volts |

Various modifications of the process and anodes of the invention may be made without departing from the spirit or scope thereof and it is to be understood that the invention is to be limited only as defined in the appended claims.

We claim:
1. An electrode comprised of a metallic base coated with at least one platinum group metal containing 0.2 to 2.0% of at least one activating element selected from the group consisting of antimony, cadmium, lead, copper, tantalum, vanadium and columbium based on the weight of the platinum group metal.
2. The electrode of claim 1 wherein the amount of activating element is 0.5 to 1.5%.
3. The electrode of claim 1 wherein the platinum group metal is platinum, the activating element is antimony and the metallic base is titanium.

References Cited

UNITED STATES PATENTS

| 2,823,101 | 2/1958 | Jockers | 252—472 XR |
| 3,123,574 | 3/1964 | Zajcew | 252—472 XR |
| 3,267,009 | 8/1966 | Greenspan | 204—290 |
| 3,276,909 | 10/1966 | Moos | 136—120 |

JOHN H. MACK, Primary Examiner.

D. R. JORDAN, Assistant Examiner.

U.S. Cl. X.R.

204—293; 252—514; 136—120